United States Patent
Liu et al.

(10) Patent No.: US 10,979,973 B2
(45) Date of Patent: Apr. 13, 2021

(54) POWER CONTROL METHOD AND APPARATUS

(71) Applicant: Huawei Technologies Co., Ltd., Shenzhen (CN)

(72) Inventors: Yun Liu, Shenzhen (CN); Peter Loc, Cupertino, CA (US); Jia Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/233,397

(22) Filed: Dec. 27, 2018

(65) Prior Publication Data

US 2019/0141629 A1    May 9, 2019

Related U.S. Application Data

(63) Continuation of application No. PCT/CN2017/086895, filed on Jun. 1, 2017.

(30) Foreign Application Priority Data

Jun. 30, 2016 (CN) .......................... 201610512609.6

(51) Int. Cl.
*H04W 72/02* (2009.01)
*H04W 52/02* (2009.01)
*H04W 84/12* (2009.01)

(52) U.S. Cl.
CPC ... *H04W 52/0209* (2013.01); *H04W 52/0229* (2013.01); *H04W 52/0235* (2013.01); *H04W 84/12* (2013.01); *Y02D 30/70* (2020.08)

(58) Field of Classification Search
None
See application file for complete search history.

(56) References Cited

U.S. PATENT DOCUMENTS

| 2008/0186890 A1* | 8/2008 | Shao ................. H04W 52/0229 370/311 |
| 2010/0046454 A1* | 2/2010 | Wentink ............ H04W 74/0816 370/329 |
| 2011/0222429 A1 | 9/2011 | Ito |
| 2011/0222453 A1 | 9/2011 | Kwon et al. |

(Continued)

FOREIGN PATENT DOCUMENTS

| CN | 102217364 A | 10/2011 |
| CN | 102550089 A | 7/2012 |

(Continued)

*Primary Examiner* — Sithu Ko
(74) *Attorney, Agent, or Firm* — Leydig, Voit & Mayer, Ltd.

(57) ABSTRACT

A power control method and apparatus are provided. The method includes: determining, by a first station obtaining a transmission opportunity (TXOP), status indication information after determining working statuses of M second stations during the TXOP, where the status indication information is used to instruct a second station in the M second stations that needs to receive data during the TXOP to remain in a listening state, and instruct a second station in the M second stations that does not need to receive data during the TXOP to enter a sleep state; and sending, by the first station, the status indication information.

9 Claims, 5 Drawing Sheets (56) References Cited

U.S. PATENT DOCUMENTS

| | | | |
|---|---|---|---|
| 2012/0045005 A1* | 2/2012 | Kim | H04W 52/0216 375/260 |
| 2013/0176921 A1 | 7/2013 | Chu et al. | |
| 2014/0204891 A1* | 7/2014 | Park | H04L 5/00 370/329 |
| 2015/0124680 A1 | 5/2015 | Kang et al. | |
| 2015/0124765 A1* | 5/2015 | Rong | H04W 72/0473 370/329 |
| 2015/0327217 A1* | 11/2015 | Aboul-Magd | H04W 72/02 370/329 |
| 2016/0081114 A1* | 3/2016 | Jung | H04W 72/04 370/329 |
| 2016/0113016 A1* | 4/2016 | Kim | H04W 52/0222 370/312 |
| 2016/0242195 A1* | 8/2016 | Kwon | H04W 72/121 |
| 2017/0126453 A1* | 5/2017 | Montreuil | H04L 27/2613 |
| 2017/0195959 A1 | 7/2017 | Park et al. | |
| 2017/0331697 A1* | 11/2017 | Cariou | H04W 72/08 |
| 2017/0367078 A1* | 12/2017 | Chun | H04L 27/26 |
| 2018/0288743 A1* | 10/2018 | Choi | H04W 74/0833 |

FOREIGN PATENT DOCUMENTS

| | | |
|---|---|---|
| CN | 103002550 A | 3/2013 |
| CN | 104869620 A | 8/2015 |
| WO | 2015170831 A1 | 11/2015 |
| WO | 2016069400 A1 | 5/2016 |

\* cited by examiner

POWER CONTROL METHOD AND APPARATUS

CROSS-REFERENCE TO RELATED APPLICATIONS

This application is a continuation of International Application No. PCT/CN2017/086895, filed on Jun. 1, 2017, which claims priority to Chinese Patent Application No. 201610512609.6, filed on Jun. 30, 2016. The disclosures of the aforementioned applications are hereby incorporated by reference in their entireties.

TECHNICAL FIELD

Embodiments of this disclosure relates to the field of wireless communications technologies, and in particular, to a power control method and apparatus.

BACKGROUND

To meet a QoS (quality of service) requirement of a high-priority service, the IEEE (Institute of Electrical and Electronic Engineers), 802.11 working group proposes a TXOP (Transmission Opportunity) technology.

In a WLAN (Wireless Local Area Network), a station obtaining a TXOP may not re-contend for a channel during the TXOP, so that the channel can be continuously used to transmit a plurality of data frames. In addition, during the TXOP, all other stations remain in a listening state, and can receive only a data frame sent by the station obtaining the TXOP. However, in this time period, not all the stations need to receive a data frame sent by the station obtaining the TXOP. If a station does not need to receive a data frame sent by the station obtaining the TXOP, but remains in the listening state, the station consumes a large amount of power. For the station that does not need to receive a data frame sent by the station obtaining the TXOP, especially a station short of power resources, how to reduce power consumption during the TXOP is a problem to be resolved.

SUMMARY

Embodiments of this application provide a power control method and apparatus, to resolve a problem of how to reduce power consumption of a station during a TXOP.

An embodiment of this application provides a power control method, including:

determining, by a first station obtaining a transmission opportunity TXOP, status indication information based on a working status of each of M second stations during the TXOP, where the status indication information is used to instruct a second station in the M second stations that needs to receive data during the TXOP to remain in a listening state, and instruct a second station in the M second stations that does not need to receive data during the TXOP to enter a sleep state; and sending, by the first station, the status indication information.

According to the method provided in this embodiment of this application, the first station instructs, by using the status indication information, the second station in the M second stations that does not need to receive data during the TXOP to enter the sleep state, so that the second station that does not need to receive data during the TXOP turns off a module such as a receiver of the second station, thereby reducing power consumption of the station, and improving an endurance capability of the station.

An embodiment of this application provides a power control apparatus. The apparatus includes:

a processing unit, configured to determine status indication information based on a working status of each of M second stations during a TXOP, where the status indication information is used to instruct a second station in the M second stations that needs to receive data during the TXOP to remain in a listening state, and instruct a second station in the M second stations that does not need to receive data during the TXOP to enter a sleep state; and a transceiver unit, configured to send the status indication information.

Optionally, the status indication information is energy distributions of N groups of subcarriers; and the processing unit is configured to:

set energy of each group of subcarriers that is in the N groups of subcarriers and that corresponds to the second station in the M second stations that needs to receive data to a first energy distribution, and set energy of each group of subcarriers that is in the N groups of subcarriers and that corresponds to the second station in the M second stations that does not need to receive data to a second energy distribution, where the second energy distribution is an energy distribution other than the first energy distribution, a second station corresponding to a group of subcarriers in the first energy distribution remains in the listening state during the TXOP, and a second station corresponding to a group of subcarriers in the second energy distribution enters the sleep state during the TXOP.

DESCRIPTION OF EMBODIMENTS

Embodiments of the present invention may be applied to a WLAN. Currently, a standard used for the WLAN is the IEEE 802.11 series. The WLAN may include a plurality of basic service sets (BSS for short). A network node in the basic service set is a station. The station includes an access point (AP for short) station and a non-access point station (Non-AP STA for short). Each basic service set may include an AP and a plurality of Non-AP STAs (the Non-AP STA is referred to as a STA for short below) associated with the AP.

The AP is also referred to as an access point, a hotspot, or the like. The AP is an access point for mobile users to access a wired network, and is mainly deployed in a home, inside a building, or inside a campus, with a typical coverage radius of tens of meters to hundreds of meters. Certainly, the AP may also be deployed outdoors. The AP is equivalent to a bridge connecting the wired network and a wireless network, and mainly functions to connect various wireless network clients together and then connect the wireless network to the Ethernet. Specifically, the AP may be a terminal device or a network device with a Wi-Fi chip.

The STA may be a wireless communications chip, a wireless sensor, or a wireless communications terminal, for example, a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, an in-vehicle communications device supporting a Wi-Fi communication function, or a computer supporting a Wi-Fi communication function.

Figure 1:
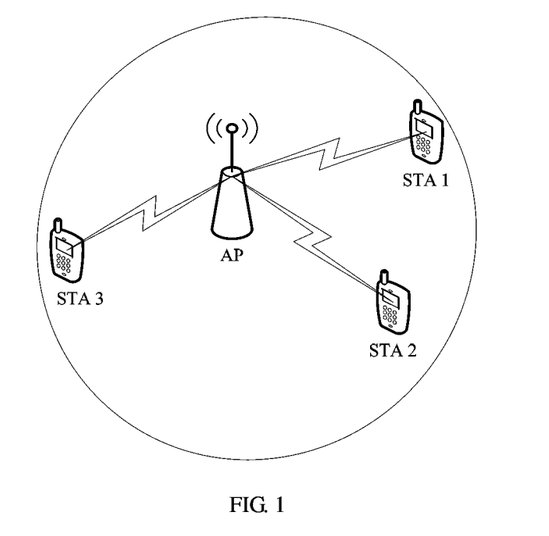
FIG. 1 is a schematic system diagram of a typical WLAN deployment scenario.

FIG. 1 is a schematic system diagram of a typical WLAN deployment scenario. In FIG. 1, one AP and three STAs are included, and the AP separately communicates with a STA 1, a STA 2, and a STA 3, to form a BSS.

Figure 2:
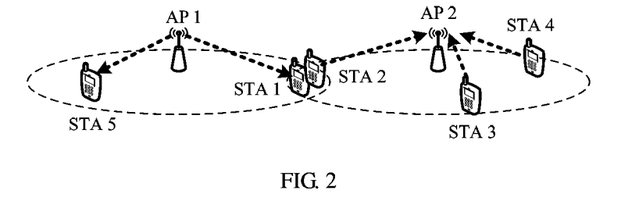
FIG. 2 is a schematic system diagram of another typical WLAN deployment scenario.

In the WLAN deployment scenario, a plurality of BSSs may coexist. FIG. 2 is a schematic system diagram of another typical WLAN deployment scenario. In the scenario shown in FIG. 2, an AP 1, a STA 1, and a STA 5 are in a same BSS, and an AP 2, a STA 2, a STA 3, and a STA 4 are in a same BSS.

Figure 3:
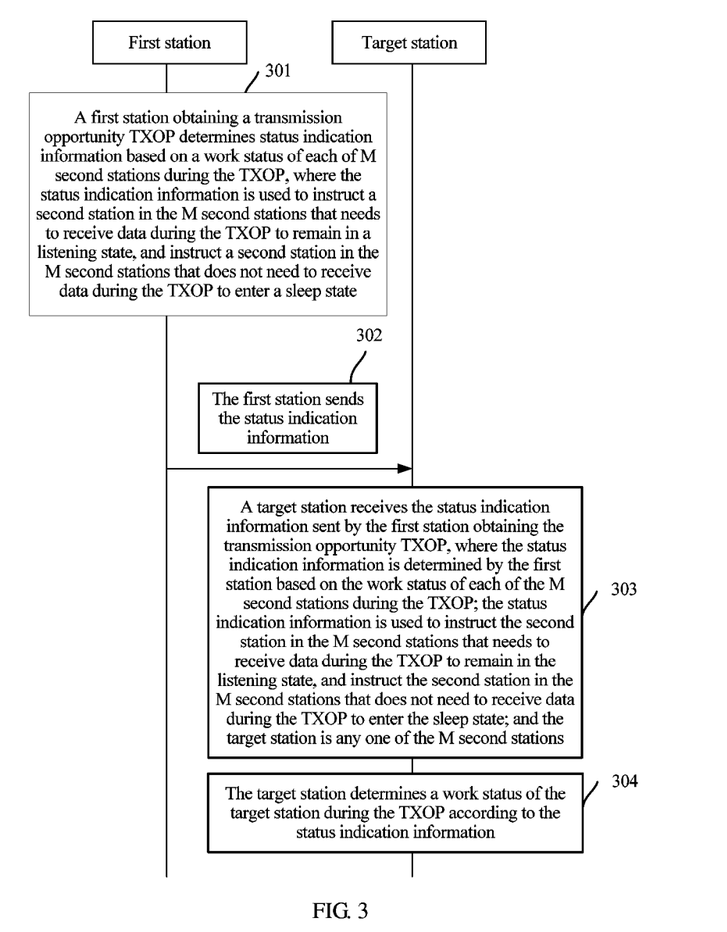
FIG. 3 is a schematic flowchart of a power control method according to an embodiment of this application.

Based on the foregoing discussion, FIG. 3 is a schematic flowchart of a power control method according to an embodiment of this application.

Referring to FIG. 3, the method includes the following steps:

Step 301: A first station obtaining a transmission opportunity TXOP determines status indication information based on a working status of each of M second stations during the TXOP, where the status indication information is used to instruct a second station in the M second stations that needs to receive data during the TXOP to remain in a listening state, and instruct a second station in the M second stations that does not need to receive data during the TXOP to enter a sleep state.

Step 302: The first station sends the status indication information.

Step 303: A target station receives the status indication information sent by the first station obtaining the transmission opportunity TXOP, where the status indication information is determined by the first station based on the working status of each of the M second stations during the TXOP; the status indication information is used to instruct the second station in the M second stations that needs to receive data during the TXOP to remain in the listening state, and instruct the second station in the M second stations that does not need to receive data during the TXOP to enter the sleep state; and the target station is any one of the M second stations.

Step 304: The target station determines a working status of the target station during the TXOP according to the status indication information.

In step 301, the first station and the M second stations may be in a same BSS. Optionally, the first station may be an AP, and each of the M second stations may be a STA. Further, each of the M second stations may be an Internet of Things (IoT) station.

The working status of each second station during the TXOP is the listening state or the sleep state. When in the listening state, the second station receives, during the TXOP, data sent by the first station. When in the sleep state, the second station does not receive, during the TXOP, data sent by the first station.

Because the first station is a data transmit end, after obtaining the TXOP, the first station may determine which ones of the M second stations need to receive data sent by the first station. For example, the first station may determine, based on a receiver address of data in a data register, the second station in the M second stations that needs to receive data during the TXOP and the second station in the M second stations that does not need to receive data during the TXOP.

After determining whether each of the M second stations needs to receive, during the TXOP, data sent by the first station, the first station can determine the working status of each second station.

After determining the working status of each of the M second stations, the first station may determine the status indication information in a plurality of manners, which are described below in detail.

In a first possible implementation, the first station determines energy distributions of N groups of subcarriers based on working statuses of the M second stations during the TXOP, and determines the energy distributions of the N groups of subcarriers as the status indication information.

It should be noted that, a signal sent by the first station needs to be carried by a subcarrier. According to the Parseval's theorem, energy contained in a signal is always equal to a sum of energy of components of the signal in a complete orthogonal function set. Therefore, an energy distribution on a subcarrier is energy of a signal carried on the subcarrier. Correspondingly, after the first station sends a signal on a subcarrier, a second station may detect, on the corresponding subcarrier by using an energy detector, whether energy exists on the subcarrier.

For example, energy of a discrete signal is a sum of squared amplitude values of discrete points in the discrete signal.

In this embodiment of this application, a group of subcarriers includes at least one subcarrier. In this case, an energy distribution of each group of subcarriers is a distribution status of energy of a signal on each subcarrier in the group of subcarriers. For example, a first energy distribution is that energy of each subcarrier in a group of subcarriers is greater than A, where A is a number greater than 0. Then, that an energy distribution of a group of subcarriers is the first energy distribution means that energy of each subcarrier in the group of subcarriers is greater than A.

With reference to the foregoing description, in this embodiment of this application, the first station may set energy of each group of subcarriers that is in the N groups of subcarriers and that corresponds to the second station in the M second stations that needs to receive data to the first energy distribution, and set energy of each group of subcarriers that is in the N groups of subcarriers and that corresponds to the second station in the M second stations that does not need to receive data to a second energy distribution. The second energy distribution is an energy distribution other than the first energy distribution.

It should be noted that, a correspondence between each of the N groups of subcarriers and each of the M second stations may be agreed on between the first station and the M second stations in advance. Details are not described herein. In addition, each of the N groups of subcarriers may correspond to at least one second station. To be specific, each of the N groups of subcarriers may correspond to a second station or a group of second stations.

In this implementation, a second station corresponding to a group of subcarriers in the first energy distribution remains in the listening state during the TXOP, and a second station corresponding to a group of subcarriers in the second energy distribution enters the sleep state during the TXOP.

It should be noted that, the first energy distribution may be that energy of each subcarrier in a group of subcarriers is greater than a threshold. Certainly, the foregoing description is only an example, and the first energy distribution may alternatively be in other forms, which are not illustrated herein one by one.

Optionally, the N groups of subcarriers may further include a check subcarrier group; and the check subcarrier group is used to perform parity check on a quantity of subcarriers whose energy is greater than the threshold in the N groups of subcarriers; or the check subcarrier group is used to perform parity check on a quantity of subcarriers whose energy is less than or equal to the threshold in the N groups of subcarriers. An energy distribution of the check subcarrier group may be determined based on an energy distribution of each of the N groups of subcarriers except the check subcarrier group.

When the check subcarrier group is used to perform even parity on the quantity of subcarriers whose energy is greater than the threshold in the N groups of subcarriers, the check subcarrier group can be used to ensure that the quantity of subcarriers whose energy is greater than the threshold in the N groups of subcarriers is an even number. Correspondingly, when the check subcarrier group is used to perform odd parity on the quantity of subcarriers whose energy is greater than the threshold in the N groups of subcarriers, the check subcarrier group can be used to ensure that the quantity of subcarriers whose energy is greater than the threshold in the N groups of subcarriers is an odd number.

Figure 4:
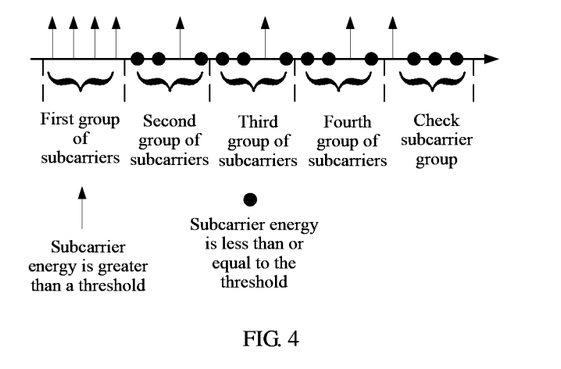
FIG. 4 is a schematic diagram of an energy distribution of subcarriers according to an embodiment of this application.

For example, FIG. 4 is a schematic diagram of an energy distribution of subcarriers according to an embodiment of this application. In FIG. 4, the status indication information sent by the first station is energy distributions of four groups of subcarriers distributed as a first group of subcarriers to a fourth group of subcarriers, a check subcarrier group is also sent together with the four groups of subcarriers, and each group of subcarriers includes four subcarriers. The first energy distribution is that energy of each subcarrier in a group of subcarriers is greater than the threshold. The second energy distribution is that energy of a third subcarrier in a group of subcarriers is greater than the threshold, and energy of all other subcarriers is less than or equal to the threshold. If only a second station corresponding to the first group of subcarriers needs to receive data, and second stations corresponding to other groups of subcarriers do not need to receive data, in this case, the energy distributions of the first group of subcarriers to the fourth group of subcarriers may be shown in FIG. 4. Based on the energy distributions of the first group of subcarriers to the fourth group of subcarriers, to ensure even parity, in this case, a quantity of subcarriers whose energy is greater than the threshold in the check subcarrier group needs to be an odd number. In this case, an energy distribution of the check subcarrier group may be shown in FIG. 4.

Figure 5:
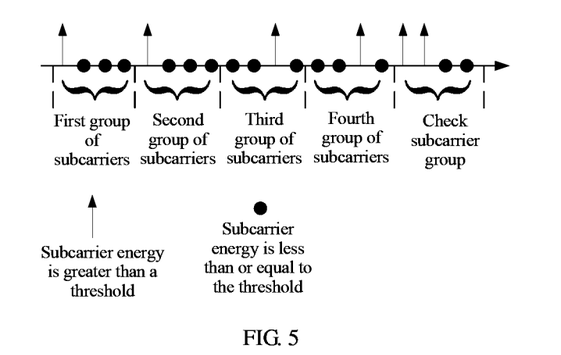
FIG. 5 is a schematic diagram of an energy distribution of subcarriers according to an embodiment of this application.

With reference to the foregoing description, for another example, as shown in FIG. 5, the first energy distribution is that energy of a first subcarrier in a group of subcarriers is greater than the threshold, and energy of all other subcarriers is less than or equal to the threshold; and the second energy distribution is that energy of a third subcarrier in a group of subcarriers is greater than the threshold, and energy of all other subcarriers is less than or equal to the threshold. If second stations corresponding to a first group of subcarriers and a second group of subcarriers need to receive data, and second stations corresponding to other groups of subcarriers do not need to receive data, in this case, the energy distributions of the first group of subcarriers to a fourth group of subcarriers may be shown in FIG. 6. Based on the energy distributions of the first group of subcarriers to the fourth group of subcarriers, to ensure even parity, in this case, a quantity of subcarriers whose energy is greater than the threshold in a check subcarrier group needs to be an even number. In this case, an energy distribution of the check subcarrier group may be shown in FIG. 6.

In this embodiment of this application, the N groups of subcarriers may be subcarriers occupied by a data field in a status indication frame sent by the first station. In this case, the first station may add the status indication information to the subcarriers occupied by the data field in the status indication frame for sending.

For example, in a WLAN, for a channel having a bandwidth of 20 MHz, when the data field in the status indication frame sent by the first station occupies 64 subcarriers, every four of the 64 subcarriers are divided as one group of subcarriers, to obtain 16 groups of subcarriers. 13 groups of subcarriers remain after 12 subcarriers used for sideband isolation are excluded from the 64 subcarriers. A correspondence is established in advance between each of the remaining 13 groups of subcarriers and at least one of the M second stations. For example, four subcarriers numbered 4, 8, 12, and 16 in the 64 subcarriers are used as one group of subcarriers, and a correspondence is established between the group of subcarriers and a second station. When determining that the second station needs to receive data during the TXOP, the first station sets an energy distribution of the group of subcarriers including the four subcarriers numbered 4, 8, 12, and 16 to the first energy distribution, to instruct the second station to remain in the listening state during the TXOP.

Figure 6:
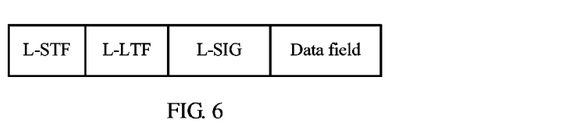
FIG. 6 is a schematic structural diagram of a status indication frame according to an embodiment of this application.

In this embodiment of this application, a structure of the status indication frame sent by the first station may have a plurality of forms. Specifically, FIG. 6 is a schematic structural diagram of a status indication frame according to an embodiment of this application. In the status indication frame shown in FIG. 6, the status indication frame includes a legacy short training field (L-STF), a legacy long training field (L-LTF), a legacy signal field (L-SIG), and a data field.

Figure 7:
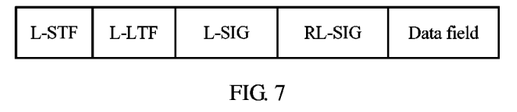
FIG. 7 is a schematic structural diagram of a status indication frame according to an embodiment of this application.

FIG. 7 is a schematic structural diagram of another status indication frame according to an embodiment of this application. In the status indication frame shown in FIG. 7, the status indication frame includes an L-STF, an L-LTF, an L-SIG, a repeat legacy signal field (RL-SIG), and a data field.

It should be noted that, for definitions and specific content of the L-STF, the L-LTF, the L-SIG, and the RL-SIG in the status indication frame, refer to descriptions in the standard of the IEEE 802.11 series. Details are not described herein.

Optionally, in this embodiment of this application, the status indication frame may further include frame type indication information, and the frame type indication information is used to indicate that a data frame including the frame type indication information is a status indication frame. In this embodiment of this application, the frame type indication information may be an energy distribution of sideband subcarriers with preset numbers in the L-SIG, or the frame type indication information may be an energy distribution of sideband subcarriers with preset numbers in the data field.

For example, if the energy distribution of the sideband subcarriers with the preset numbers in the L-SIG is a third energy distribution or the frame type indication information is that the energy distribution of the sideband subcarriers with the preset numbers in the data field is the third energy distribution, it indicates that a data frame including the frame type indication information is a status indication frame. It should be noted that, the third energy distribution may be determined depending on an actual condition. Details are not described herein.

In this embodiment of this application, with the frame type indication information, a second station receiving the status indication frame can determine in advance that the status indication frame includes the status indication information, and can process the status indication frame in time, to determine a working status of the second station during the TXOP.

Optionally, in this embodiment of this application, an energy distribution of sideband subcarriers numbered −28, −27, +27, and +28 in the L-SIG may be used as the frame type indication information. Correspondingly, an energy distribution of sideband subcarriers numbered −28, −27, +27, and +28 in the data field may be used as the frame type indication information.

In a second possible implementation, the first station may determine, as the status indication information, an identifier of the second station in the M second stations that needs to receive data during the TXOP. The identifier of the second station may be a station identifier of the second station or a group identifier of the second station.

Specifically, the M second stations may include J second stations and K groups of grouped stations, the K groups of grouped stations include P second stations in the M second stations other than the J second stations, P+J=M, and each of the K groups of grouped stations may include at least one of the M second stations.

With reference to the foregoing description, the first station may determine, as the status indication information, station identifiers of N second stations that are in the J second stations and that need to receive data during the TXOP and group identifiers of Q groups of grouped stations that are in the K groups of grouped stations and that need to receive data during the TXOP, where N is less than or equal to J, and Q is less than or equal to K.

In this implementation, the status indication information is used to instruct the target station receiving the status indication information to remain in the listening state during the TXOP after determining that a station identifier of the target station or a group identifier of a station group in which the target station is located is in the status indication information, or enter the sleep state during the TXOP after determining that a station identifier of the target station or a group identifier of a station group in which the target station is located is not in the status indication information. The target station is any one of the M second stations.

It should be noted that, working statuses of all second stations in a group of grouped stations are synchronized. That is, during the TXOP, all the second stations in the group of grouped stations need to receive data sent by the first station, or no second station in the group of grouped stations needs to receive data sent by the first station.

It should be noted that, the station identifier of the second station may be a MAC (Medium/Media Access Control) address of the second station, or may be a sequence number preset for the second station. This is not limited in this embodiment of this application. Correspondingly, the group identifier may be a sequence number preset for a group of second stations. This is not limited in this embodiment of this application.

Correspondingly, in this implementation, in this embodiment of this application, the first station may add the status indication information to a data field in a status indication frame for sending. For a structure of the status indication frame, refer to FIG. 6 and FIG. 7 and descriptions related to FIG. 6 and FIG. 7. Details are not described herein again.

Optionally, the data field in the status indication frame sent by the first station further includes cyclic redundancy check (CRC) information, and the CRC information is located before the status indication information, and is used to perform CRC check on the status indication information.

Figure 8:
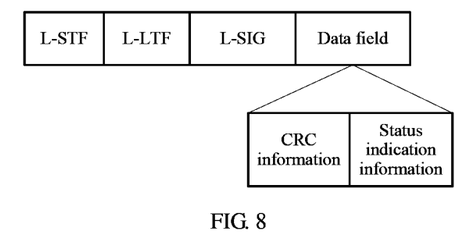
FIG. 8 is a schematic structural diagram of a status indication frame according to an embodiment of this application.

For example, FIG. 8 is a schematic structural diagram of a status indication frame according to an embodiment of this application. In the status indication frame shown in FIG. 8, the status indication frame includes an L-STF, an L-LTF, an L-SIG, and a data field. Certainly, the status indication frame shown in FIG. 8 may further include an RL-SIG. Details are not described herein. The data field in the status indication frame shown in FIG. 8 includes CRC information and status indication information, and the CRC information is located before the status indication information.

Optionally, the CRC information may alternatively be located after the status indication information.

Further, in this embodiment of this application, after determining the CRC information, the first station may further reverse an order of bits in the CRC information, that is, reversely rearrange the bits based on an LSB (least significant bit)-to-MSB (most significant bit) arrangement order in the determined CRC information. In this case, after receiving the CRC information, a second station may reverse the order of the bits in the CRC information, to obtain the CRC information determined by the first station. In this embodiment of this application, after determining the CRC information, the first station may further perform bitwise NOT on bits in the CRC information. In this case, after receiving the CRC information, a second station may perform bitwise NOT on the bits in the CRC information, to obtain the CRC information determined by the first station.

In a third possible implementation, the first station may redefine an existing field in a status indication frame, and send the status indication information by using the redefined field.

A tail field in an L-SIG occupies six bits, all of which are usually set to 0 during transmission. Therefore, in this embodiment of this application, the first station may redefine the tail field in the L-SIG in the status indication frame, to send the status indication information by using the tail field in the L-SIG.

In this implementation, the status indication information is located in the tail field in the L-SIG in the status indication frame. With reference to the foregoing description, in a possible manner, one of the M second stations corresponds to Q bits in the tail field, and Q is less than or equal to 6 and is greater than 0. In addition, one of the M second stations corresponds to a preset bit sequence including Q bits.

It should be noted that, a correspondence between each bit in the tail field and a second station may be agreed on in advance. Details are not described herein.

The first station may set a bit sequence including Q bits corresponding to each of the M second stations that needs to receive data during the TXOP to a preset bit sequence corresponding to each second station.

With reference to the foregoing description, when a bit sequence that is in the tail field and that includes Q bits corresponding to one of the M second stations is a preset bit sequence corresponding to the second station, the second station is instructed to remain in the listening state during the TXOP. When a bit sequence that is in the tail field and that includes Q bits corresponding to one of the M second stations is not a preset bit sequence corresponding to the second station, the second station is instructed to enter the sleep state during the TXOP.

It should be noted that, in the M second stations, a plurality of second stations may correspond to same Q bits in the tail field, and preset bit sequences corresponding to the plurality of second stations may be the same.

For example, all of the six bits in the tail field correspond to three second stations: a station 1, a station 2, and a station 3. In addition, the station 1, the station 2, and the station 3 respectively correspond to preset bit sequences 110110, 110101, and 110011. When determining that the station 1 needs to remain in the listening state, and the station 2 and the station 3 both enter the sleep state, the first station sets the tail field to 110110.

For example, all of the six bits in the tail field correspond to eight second stations: a station 1 to a station 8. In addition, the station 1 to a station 4 all correspond to a preset bit sequence 110110, and a station 5 to the station 8 all correspond to a preset bit sequence 110011. When determining that the station 1 to the station 4 need to enter the sleep state, and the station 5 to the station 8 all remain in the listening state, the first station sets the tail field to 110011.

Optionally, in this embodiment of this application, the first station may set priorities for the M second stations, and determine the status indication information first based on a second station with a high priority in the M second stations.

For example, all of the six bits in the tail field correspond to three second stations: a station 1, a station 2, and a station 3 in descending order of priorities. In addition, the station 1, the station 2, and the station 3 respectively correspond to preset bit sequences 110110, 110101, and 110011. When the first station determines that the station 1 and the station 3 need to remain in the listening state, and the station 2 needs to enter the sleep state, in this case, the first station determines the status indication information first based on the station 1, that is, sets the tail field to 110110.

In this implementation, in another possible manner, one bit in the tail field uniquely corresponds to one of the J second stations, or one bit in the tail field uniquely corresponds to one of the K groups of grouped stations.

It should be noted that, a correspondence between each bit in the tail field and a second station or a group of grouped stations may be agreed on in advance. Details are not described herein.

The first station may set a value of a bit corresponding to a second station in the J second stations that needs to receive data during the TXOP and a value of a bit corresponding to each of the K groups of grouped stations that needs to receive data during the TXOP to a first preset value, and set a value of a bit corresponding to a second station in the J second stations that does not need to receive data during the TXOP and a value of a bit corresponding to each of the K groups of grouped stations that does not need to receive data during the TXOP to a second preset value.

With reference to the foregoing description, when a value of a bit in the tail field is the first preset value, a second station corresponding to the bit or each second station in a station group corresponding to the bit is instructed to remain in the listening state during the TXOP. When a value of a bit in the tail field is the second preset value, a second station corresponding to the bit or each second station in a station group corresponding to the bit is instructed to enter the sleep state during the TXOP.

For example, the first preset value may be 1, and the second preset value may be 0. Certainly, the foregoing description is only an example. Alternatively, the first preset value may be 0, and correspondingly, the second preset value may be 1.

Optionally, in this implementation, the status indication frame sent by the first station may include at least an L-STF, an L-LTF, and the L-SIG.

In step 302, the first station may send the status indication information by using the subcarriers occupied by the data field in the status indication frame, or may add the status indication information to the data field for sending, or may add the status indication information to the tail field in the L-SIG for sending. For details, refer to the foregoing description, and the details are not described herein again.

It should be noted that, the first station sends the status indication frame in a broadcast manner.

In step 303, the target station may obtain the status indication information by using the status indication frame sent by the first station. It should be noted that, for the structure of the status indication frame, refer to the description in step 301. Details are not described herein again.

As described above, in this embodiment of this application, the status indication information sent by the first station may be the energy distributions of the N groups of subcarriers.

In this implementation, an energy distribution of each group of subcarriers that is in the N groups of subcarriers and that corresponds to the second station in the M second stations that needs to receive data is the first energy distribution, and an energy distribution of each group of subcarriers that is in the N groups of subcarriers and that corresponds to the second station in the M second stations that does not need to receive data is the second energy distribution.

The second energy distribution is an energy distribution other than the first energy distribution, a second station corresponding to a group of subcarriers in the first energy distribution remains in the listening state during the TXOP, and a second station corresponding to a group of subcarriers in the second energy distribution enters the sleep state during the TXOP.

After receiving the status indication frame, the target station may further determine whether the received data frame is a status indication frame. The target station may perform FCS (forward correction code) detection on a last symbol occupied by the data field in the status indication frame, and may determine that the received data frame is a status indication frame when FCS detection fails. The symbol may be an orthogonal frequency division multiplexing (OFDM) symbol.

It should be noted that, when the first station generates the data field in the status indication frame, the first station sets energy of the subcarriers occupied by the data field, instead of using a manner in the IEEE 802.11 series of first encoding a bit in the data field in an FCS manner and then modulating the encoded bit into a corresponding symbol; therefore, the last symbol occupied by the data field fails in FCS detection. Therefore, when the last symbol occupied by the data field fails in FCS detection, it indicates that the data frame received by the target station is a status indication frame.

Further, when the target station performs FCS detection on the last symbol occupied by the data field in the status indication frame, the target station may further detect whether a transmission time length of the data field in the status indication frame is a preset time length, and if the target station determines that the last symbol occupied by the data field fails in FCS detection, and the transmission time length of the data field is the preset time length, the target station may determine that the received data frame is a status indication frame.

It should be noted that, the preset time length may be determined depending on an actual condition. For example, when the data field occupies one symbol, the preset time length may be 24 microseconds.

Optionally, if the N groups of subcarriers received by the target station include the frame type indication information, the target station may further determine, based on the frame type indication information, whether the received data frame is a status indication frame. When the frame type indication information is detected in the received data frame, the target station may determine that the received data frame is a status indication frame.

It should be noted that, for specific content of the frame type indication information, refer to the foregoing description. Details are not described herein again.

Optionally, the N groups of subcarriers received by the target station may further include the check subcarrier group; and the check subcarrier group is used to perform parity check on the quantity of subcarriers whose energy is greater than the threshold in the N groups of subcarriers; or the check subcarrier group is used to perform parity check on the quantity of subcarriers whose energy is less than or equal to the threshold in the N groups of subcarriers.

The target station may check the N groups of subcarriers based on the check subcarrier group, and when the check fails, may consider that receiving of the status indication information fails.

With reference to the foregoing description, in this implementation, in step 304, when the target station determines that an energy distribution of a group of subcarriers corresponding to the target station is the first energy distribution, the second station that needs to receive data remains in the listening state during the TXOP; when the target station determines that an energy distribution of a group of subcarriers corresponding to the target station is the second energy distribution, the second station that needs to receive data enters the sleep state during the TXOP.

The target station entering the sleep state turns off a module such as a transceiver. In this case, the target station cannot listen on a channel, nor receive a data frame, thereby reducing power consumption, and prolonging a service time of the target station.

In step 303, the target station may alternatively obtain the status indication information by using the data field in the status indication frame sent by the first station.

In this implementation, the status indication information may include the station identifiers of the N second stations that are in the J second stations and that need to receive data and the group identifiers of the Q groups of grouped stations that are in the K groups of grouped stations and that need to receive data.

In this case, in step 304, if determining that a station identifier of the target station or a group identifier of a station group in which the target station is located is in the status indication information, the target station determines that the target station remains in the listening state during the TXOP.

If determining that a station identifier of the target station or a group identifier of a station group in which the target station is located is not in the status indication information, the target station determines that the target station enters the sleep state during the TXOP.

Optionally, the data field further includes the cyclic redundancy check CRC information, and the CRC information is located before the status indication information. The target station may perform CRC check on the status indication information based on the CRC information.

In step 303, the target station may alternatively obtain the status indication information by using the tail field in the L-SIG in the status indication frame sent by the first station.

With reference to the foregoing description, in a possible implementation, the status indication information is located in the tail field in the L-SIG in the status indication frame, one of the M second stations corresponds to Q bits in the tail field, and Q is less than or equal to 6 and is greater than 0.

In this case, in step 304, if determining that a bit sequence that is in the tail field and that includes Q bits corresponding to the target station is a preset bit sequence corresponding to the target station, the target station determines that the target station remains in the listening state during the TXOP; if determining that a bit sequence that is in the tail field and that includes Q bits corresponding to the target station is not a preset bit sequence corresponding to the target station, the target station determines that the target station enters the sleep state during the TXOP.

In another possible implementation, one bit in the tail field uniquely corresponds to one of the J second stations, or one bit in the tail field uniquely corresponds to one of the K groups of grouped stations. A value of a bit corresponding to a second station in the J second stations that needs to receive data during the TXOP and a value of a bit corresponding to each of the K groups of grouped stations that needs to receive data during the TXOP are the first preset value, and a value of a bit corresponding to a second station in the J second stations that does not need to receive data during the TXOP and a value of a bit corresponding to each of the K groups of grouped stations that does not need to receive data during the TXOP are the second preset value.

In step 304, if determining that a value of a bit that is in the tail field and that corresponds to the target station is the first preset value, the target station determines that the target station remains in the listening state during the TXOP.

If determining that a value of a bit that is in the tail field and that corresponds to the target station is the second preset value, the target station determines that the target station enters the sleep state during the TXOP.

Optionally, after determining, based on the status indication information in the status indication frame, that the target station remains in the listening state during the TXOP, the target station may further send an acknowledgement (ACK) frame to the first station, so that the first station determines that the target station correctly receives the status indication frame.

Based on a same invention idea, an embodiment of this application further provides a power control apparatus, and the apparatus can perform the foregoing method.

Figure 9:
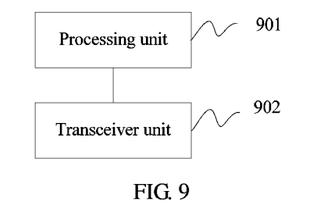
FIG. 9 is a schematic structural diagram of a power control apparatus according to an embodiment of this application.

FIG. 9 is a schematic structural diagram of a power control apparatus according to an embodiment of this application.

Referring to FIG. 9, the apparatus includes:

a processing unit 901, configured to determine status indication information based on a working status of each of M second stations during a TXOP, where the status indication information is used to instruct a second station in the M second stations that needs to receive data during the TXOP to remain in a listening state, and instruct a second station in the M second stations that does not need to receive data during the TXOP to enter a sleep state; and a transceiver unit 902, configured to send the status indication information.

Optionally, the status indication information is energy distributions of N groups of subcarriers; and the processing unit 901 is configured to:

set energy of each group of subcarriers that is in the N groups of subcarriers and that corresponds to the second station in the M second stations that needs to receive data to a first energy distribution, and set energy of each group of subcarriers that is in the N groups of subcarriers and that corresponds to the second station in the M second stations that does not need to receive data to a second energy distribution, where the second energy distribution is an energy distribution other than the first energy distribution, a second station corresponding to a group of subcarriers in the first energy distribution remains in the listening state during the TXOP, and a second station corresponding to a group of subcarriers in the second energy distribution enters the sleep state during the TXOP.

Optionally, the first energy distribution is that energy of each subcarrier in a group of subcarriers is greater than a threshold.

Optionally, the N groups of subcarriers further include a check subcarrier group; and the check subcarrier group is used to perform parity check on a quantity of subcarriers whose energy is greater than the threshold in the N groups of subcarriers; or the check subcarrier group is used to perform parity check on a quantity of subcarriers whose energy is less than or equal to the threshold in the N groups of subcarriers.

Optionally, the N groups of subcarriers are subcarriers occupied by a data field in a status indication frame; and the transceiver unit 902 is configured to:

add the status indication information to the subcarriers occupied by the data field in the status indication frame for sending.

Optionally, the status indication frame includes a legacy short training field L-STF, a legacy long training field L-LTF, a legacy signal field L-SIG, and the data field; or the status indication frame includes an L-STF, an L-LTF, an L-SIG, a repeat legacy signal field RL-SIG, and the data field.

Optionally, the status indication frame further includes frame type indication information; and the frame type indication information is used to indicate that a data frame including the frame type indication information is a status indication frame.

Optionally, the M second stations include J second stations and K groups of grouped stations, the K groups of grouped stations include P second stations in the M second stations other than the J second stations, and P+J=M;

the processing unit 901 is configured to:

determine, as the status indication information, station identifiers of N second stations that are in the J second stations and that need to receive data during the TXOP and group identifiers of Q groups of grouped stations that are in the K groups of grouped stations and that need to receive data during the TXOP, where N is less than or equal to J, and Q is less than or equal to K, where the status indication information is used to instruct a target station receiving the status indication information to remain in the listening state during the TXOP after determining that a station identifier of the target station or a group identifier of a station group in which the target station is located is in the status indication information, or enter the sleep state during the TXOP after determining that a station identifier of the target station or a group identifier of a station group in which the target station is located is not in the status indication information; and the target station is any one of the M second stations; and the transceiver unit 902 is configured to:

add the status indication information to a data field in a status indication frame for sending.

Optionally, the data field further includes cyclic redundancy check CRC information, and the CRC information is located before the status indication information, and is used to perform CRC check on the status indication information.

Optionally, the status indication information is located in a tail field in an L-SIG in a status indication frame, one of the M second stations corresponds to Q bits in the tail field, and Q is less than or equal to 6 and is greater than 0; and the processing unit 901 is configured to:

set a bit sequence including Q bits corresponding to each of the M second stations that needs to receive data during the TXOP to a preset bit sequence corresponding to each second station, where when a bit sequence that is in the tail field and that includes Q bits corresponding to one of the M second stations is a preset bit sequence corresponding to the second station, the second station is instructed to remain in the listening state during the TXOP.

Based on a same invention idea, an embodiment of this application further provides a power control apparatus, and the apparatus can perform the foregoing method.

Figure 10:
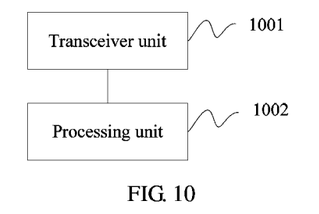
FIG. 10 is a schematic structural diagram of a power control apparatus according to an embodiment of this application.

FIG. 10 is a schematic structural diagram of a power control apparatus according to an embodiment of this application.

Referring to FIG. 10, the apparatus includes:

a transceiver unit 1001, configured to receive status indication information sent by a first station obtaining a transmission opportunity TXOP, where the status indication information is determined by the first station based on a working status of each of M second stations during the TXOP; the status indication information is used to instruct a second station in the M second stations that needs to receive data during the TXOP to remain in a listening state, and instruct a second station in the M second stations that does not need to receive data during the TXOP to enter a sleep state; and the apparatus is any one of the M second stations; and a processing unit 1002, configured to determine a working status of the target station during the TXOP according to the status indication information.

For a work principle of the apparatus, refer to the foregoing method implementation. Details are not described herein again.

Based on a same invention idea, an embodiment of this application further provides a power control apparatus, and the apparatus can perform the foregoing method.

Figure 11:
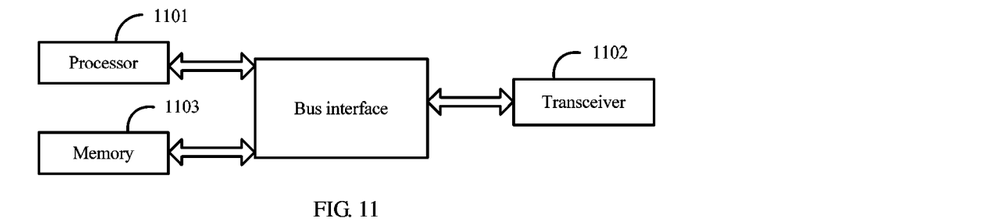
FIG. 11 is a schematic structural diagram of a power control apparatus according to an embodiment of this application.

FIG. 11 is a schematic structural diagram of a power control apparatus according to an embodiment of this application.

Referring to FIG. 11, the apparatus includes: a processor 1101, a transceiver 1102, and a memory 1103.

The transceiver 1102 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof. The processor 1101 may be a central processing unit (CPU for short), a network processor (NP for short), or a combination of a CPU and an NP. The processor 701 may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (FPGA for short), a generic array logic (GAL for short), or any combination thereof. The memory 1103 may include a volatile memory, for example, a random-access memory (RAM for short); or the memory 1103 may include a non-volatile memory, for example, a read-only memory (ROM for short), a flash memory, a hard disk drive (HDD for short), or a solid-state drive (SSD for short); or the memory 1103 may include a combination of the foregoing memories.

The memory 1103 may be configured to store a program.

The processor 1101 is configured to determine status indication information based on a working status of each of M second stations during a TXOP, where the status indication information is used to instruct a second station in the M second stations that needs to receive data during the TXOP to remain in a listening state, and instruct a second station in the M second stations that does not need to receive data during the TXOP to enter a sleep state.

The transceiver 1102 is configured to send the status indication information.

Optionally, the status indication information is energy distributions of N groups of sub carriers.

For a work principle of the apparatus, refer to the foregoing method implementation. Details are not described herein again.

Based on a same invention idea, an embodiment of this application further provides a power control apparatus, and the apparatus can perform the foregoing method.

Figure 12:
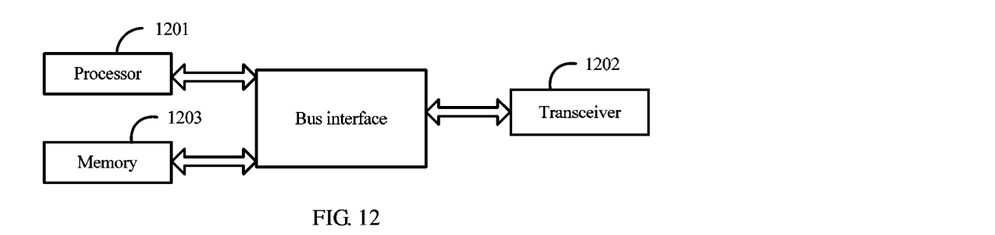
FIG. 12 is a schematic structural diagram of a power control apparatus according to an embodiment of this application.

FIG. 12 is a schematic structural diagram of a power control apparatus according to an embodiment of this application.

Referring to FIG. 12, the apparatus includes: a processor 1201, a transceiver 1202, and a memory 1203.

The transceiver 1202 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof. The processor 1201 may be a central processing unit, a network processor, or a combination of a CPU and an NP. The processor 1201 may further include a hardware chip. The hardware chip may be an application-specific integrated circuit, a programmable logic device, or a combination thereof. The PLD may be a complex programmable logic device, a field-programmable gate array, a generic array logic, or any combination thereof. The memory 1203 may include a volatile memory, for example, a random-access memory; or the memory 1203 may include a non-volatile memory, for example, a read-only memory, a flash memory, a hard disk drive, or a solid-state drive; or the memory 1203 may include a combination of the foregoing memories.

The memory 1203 may be configured to store a program.

The transceiver 1202 is configured to receive status indication information sent by a first station obtaining a transmission opportunity TXOP, where the status indication information is determined by the first station based on a working status of each of M second stations during the TXOP; the status indication information is used to instruct a second station in the M second stations that needs to receive data during the TXOP to remain in a listening state, and instruct a second station in the M second stations that does not need to receive data during the TXOP to enter a sleep state; and the apparatus is any one of the M second stations.

The processor 1201 is configured to determine a working status of the target station during the TXOP according to the status indication information.

For a work principle of the apparatus, refer to the foregoing method implementation. Details are not described herein again.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the appended claims are intended to be construed as to cover the preferred embodiments and all changes and modifications falling within the scope of this application.

Obviously, a person skilled in the art can make various modifications and variations to this application without departing from the scope of this application. This application is intended to cover these modifications and variations provided that they fall within the scope of protection defined by the following claims.

What is claimed is:

1. A power control method comprising:
   determining, by a first station obtaining a transmission opportunity (TXOP), status indication information based on a working status of each of a plurality of stations during the TXOP, wherein the status indication information instructs a second station in the plurality of stations that needs to receive data during the TXOP to remain in a listening state, and instructs a third station in the plurality of stations that does not need to receive data during the TXOP to enter a sleep state; and
   sending, by the first station, the status indication information,
   wherein the status indication information is energy distributions of groups of subcarriers and wherein the groups of subcarriers further comprise a check subcarrier group, and wherein the check subcarrier group is used to:
     perform a parity check on a quantity of subcarriers whose energy is greater than a threshold in the groups of subcarriers, or
     perform the parity check on a quantity of subcarriers whose energy is less than or equal to a threshold in the groups of subcarriers,
   wherein determining the status indication information based on the working status of each of the plurality of stations during the TXOP comprises:
   setting, by the first station, energy of each group of subcarriers that is in the groups of subcarriers and that corresponds to the second station to a first energy distribution, and setting energy of each group of subcarriers that is in the groups of subcarriers and that corresponds to the third station to a second energy distribution, wherein the second energy distribution is an energy distribution other than the first energy distribution, the second station corresponding to a group of subcarriers in the first energy distribution remains in the listening state during the TXOP, and the third station corresponding to a group of subcarriers in the second energy distribution enters the sleep state during the TXOP.

2. The method according to claim 1, wherein the first energy distribution is that energy of each subcarrier in a group of subcarriers is greater than a threshold.

3. The method according to claim 1, wherein the groups of subcarriers in at least the first energy distribution are subcarriers occupied by a data field in a status indication frame; and
   wherein sending the status indication information comprises:
     adding, by the first station, the status indication information to the subcarriers occupied by the data field in the status indication frame for sending.

4. A power control apparatus comprising:
   a processor, configured to determine status indication information based on a working status of each of a plurality of stations during a transmission opportunity (TXOP), wherein the status indication information instructs a second station in the plurality of stations that needs to receive data during the TXOP to remain in a listening state, and instructs a third station in the plurality of stations that does not need to receive data during the TXOP to enter a sleep state; and
   a transceiver, configured to cooperate with the processor to send the status indication information,
   wherein the status indication information is energy distributions of groups of subcarriers and wherein the groups of subcarriers further comprise a check subcarrier group, and wherein the check subcarrier group is used to:
     perform parity check on a quantity of subcarriers whose energy is greater than a threshold in the groups of subcarriers, or
     perform the parity check on a quantity of subcarriers whose energy is less than or equal to a threshold in the groups of subcarriers,
   wherein the processor is configured to:
   set energy of each group of subcarriers that is in the groups of subcarriers and that corresponds to the second station to a first energy distribution, and set energy of each group of subcarriers that is in the groups of subcarriers and that corresponds to the third station to a second energy distribution, wherein the second energy distribution is an energy distribution other than the first energy distribution, the second station corresponding to a group of subcarriers in the first energy distribution remains in the listening state during the TXOP, and the third station corresponding to a group of subcarriers in the second energy distribution enters the sleep state during the TXOP.

5. The apparatus according to claim 4, wherein the first energy distribution is that energy of each subcarrier in a group of subcarriers is greater than a threshold.

6. The apparatus according to claim 4, wherein the groups of subcarriers in at least the first energy distribution are subcarriers occupied by a data field in a status indication frame; and
   wherein the transceiver is configured to:
   cooperate with the processor to add the status indication information to the subcarriers occupied by the data field in the status indication frame for sending.

7. A power control apparatus comprising:
   a transceiver, configured to cooperate with a processor to receive status indication information sent by a first station obtaining a transmission opportunity (TXOP), wherein the status indication information is determined by the first station based on a working status of each of a plurality of stations during the TXOP; the status indication information instructs a second station in the plurality of stations that needs to receive data during the TXOP to remain in a listening state, and instructs a third station in the plurality of stations that does not need to receive data during the TXOP to enter a sleep state; and the apparatus is any one of the plurality of stations; and
   the processor, configured to determine a working status of a target station during the TXOP according to the status indication information,
   wherein the status indication information is energy distributions of groups of subcarriers and wherein the groups of subcarriers further comprise a check subcarrier group, and wherein the check subcarrier group is used to:

perform parity check on a quantity of subcarriers whose energy is greater than a threshold in the groups of subcarriers, or perform the parity check on a quantity of subcarriers whose energy is less than or equal to a threshold in the groups of subcarriers, wherein an energy distribution of each group of subcarriers that is in the groups of subcarriers and that corresponds to the second station is a first energy distribution, and an energy distribution of each group of subcarriers that is in the groups of subcarriers and that corresponds to the third station is a second energy distribution, and wherein the second energy distribution is an energy distribution other than the first energy distribution, the second station corresponding to a group of subcarriers in the first energy distribution remains in the listening state during the TXOP, and the third station corresponding to a group of subcarriers in the second energy distribution enters the sleep state during the TXOP.

8. The apparatus according to claim 7, wherein the first energy distribution is that energy of each subcarrier in a group of subcarriers is greater than a threshold.

9. The apparatus according to claim 7, wherein the groups of subcarriers in at least the first energy distribution are subcarriers occupied by a data field in a status indication frame; and wherein the transceiver is configured to:

cooperate with the processor to obtain the status indication information by using the subcarriers occupied by the data field in the status indication frame sent by the first station.

\* \* \* \* \*